US012650562B2

(12) United States Patent

Kappel

(10) Patent No.: US 12,650,562 B2

(45) Date of Patent: Jun. 9, 2026

(54) MOUNTING DEVICE FOR A FIBER-OPTIC CABLE

(71) Applicant: Schott AG, Mainz (DE)

(72) Inventor: Markus Kappel, Mainz (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 19/216,144

(22) Filed: May 22, 2025

(65) Prior Publication Data

US 2025/0362462 A1 Nov. 27, 2025

(30) Foreign Application Priority Data

May 22, 2024 (DE) ..................... 10 2024 114 365.7

(51) Int. Cl.
*G02B 6/38* (2006.01)

(52) U.S. Cl.
CPC ......... *G02B 6/3893* (2013.01); *G02B 6/3861* (2013.01)

(58) Field of Classification Search
CPC .................................................. G02B 6/3893
USPC .......................................................... 385/78
See application file for complete search history.

(56) References Cited

U.S. PATENT DOCUMENTS

| | | | | | |
|---|---|---|---|---|---|
| 5,653,726 | A * | 8/1997 | Kieturakis | ......... | A61B 17/0218 606/190 |
| 11,191,428 | B1 * | 12/2021 | Chang | ...................... | A61B 1/06 |
| 12,055,766 | B2 * | 8/2024 | Pupalaikis | ........... | G02B 6/3628 |

| | | | | | |
|---|---|---|---|---|---|
| 2005/0192480 | A1 * | 9/2005 | Toriya | ................ | A61B 1/00167 600/128 |
| 2006/0293645 | A1 * | 12/2006 | Hibner | ................. | A61B 5/4318 606/2 |
| 2022/0000346 | A1 * | 1/2022 | Switzer | .............. | A61B 1/00059 |

(Continued)

FOREIGN PATENT DOCUMENTS

| | | | | | |
|---|---|---|---|---|---|
| CH | 703327 | A2 * | 12/2011 | ........... | G02B 6/4478 |
| CN | 101528113 | B * | 2/2013 | ......... | G02B 23/2476 |
| CN | 108508542 | A * | 9/2018 | ........... | G02B 6/3898 |

(Continued)

OTHER PUBLICATIONS

G. Erhard, "Konstruieren mit Kunststoffen (Building with plastics)", 4th edition, Carl Hanser Verlag, Munich, 2008, pp. 152-153 (1 page).

(Continued)

*Primary Examiner* — Kaveh C Kianni

(74) *Attorney, Agent, or Firm* — TAYLOR & EDELSTEIN, PC

(57) ABSTRACT

A mounting device for a fiber-optic cable that includes a light guide including an optical fiber and a cladding which fully encloses the light guide at least in portions on its outer circumferential face. The mounting device is formed from one piece or from a first and a second segment, and has a first fixing portion and a second fixing portion spatially separated from the first fixing portion. The second fixing portion is arranged concentrically around the first fixing portion, and the light guide is connected or connectable at least partially or in portions materially to the first fixing portion and the cladding is connected or connectable to the second fixing portion at least partially or in portions with a form fit, a force fit and/or materially, so that fixing of the light guide and fixing of the cladding on the mounting device are separated or separable from one another.

15 Claims, 3 Drawing Sheets

(56)                    References Cited

U.S. PATENT DOCUMENTS

2024/0302586  A1 *   9/2024   Schultheis  .............  G02B 23/26
2025/0224096  A1 *   7/2025   Schultheis  ...........  G02B 6/0008

FOREIGN PATENT DOCUMENTS

DE        10 2008 044 938  A1      3/2010
DE        10 2016 116 409  A1      3/2017
JP              2011-2821  A       1/2011
JP            2016-194602  A      11/2016

OTHER PUBLICATIONS

German Office Action dated Jan. 13, 2025 for German Application
No. 10 2024 114 365.7 (3 pages).

* cited by examiner

MOUNTING DEVICE FOR A FIBER-OPTIC CABLE

CROSS REFERENCE TO RELATED APPLICATIONS

This application claims priority to German Patent Application No. 10 2024 114 365.7 filed on May 22, 2024, which is incorporated in its entirety herein by reference.

BACKGROUND OF THE INVENTION

1. Field of the Invention

The invention relates to a mounting device for a fiber-optic cable, wherein the fiber-optic cable comprises a light guide comprising or consisting of at least one optical fiber or a bundle of a plurality of optical fibers, and a cladding which fully encloses the light guide at least in portions on its outer circumferential face.

2. Description of the Related Art

Mounting devices for fiber-optic cables are known as end sleeves, sleeves or ferrules, the cable comprising the fiber-optic light guides usually being adhesively bonded into these sleeves in order on the one hand to ensure a firm connection, and on the other hand moreover to prevent the ingress of dirt and/or moisture. The latter may otherwise in the long term impair the functionality of such component parts, whether for the transmission of light and/or the transmission of images.

Usually, such sleeves are made of metal or plastics. In order to protect fiber-optic light-guide fibers against mechanical stress and fouling, the envelope tube, generally a polymer, which receives the fibers must be firmly connected to the sleeve. Absence of this protection or failure of the connection of the sleeve and the tube will sooner or later inevitably lead by glass corrosion, for example by alkaline attack or moisture, by fouling or ingress of particles, for example dust, or by mechanical stress, in particular bending stresses, to impairment of the fibers or even fiber fracture. The component part then fails or no longer fulfils the requisite performance in respect of the transmission of light or images.

Until now, the tube or envelope tube, or cladding or clad, of the fibers or of the fiber bundle has been jointly introduced into the sleeve during the manufacture of such cables and the fiber bundle has been adhesively bonded to or in the sleeve. For this purpose, a compensation region has been provided on the sleeve, i.e. the latter has been designed to be longer in order to prevent exposure of the fiber bundle during subsequent shrinking of the tube.

There is always shrinkage or shrinking of the tube, particularly in the case of those made of polymers, under any thermal stress or influences of moisture, and it is generally greater than the length of the sleeve, or of the compensating region of the sleeve, permits by design. The cables are therefore sometimes already cut into pieces before manufacture and are often subjected to a heat treatment, possibly several times. Even after this, it is not certain that in the course of the prescribed service life of the component part and under the permissible conditions of use, for example from 40° C. to 80° C. or more, and moisture of up to 95% relative humidity, the clad will not slip out of the sleeve, or a gap will not be formed in or from the sleeve and the bundle will not be at least partially exposed unprotected. Shrinkage may moreover also occur after the heat treatment, or even without heat treatment, if for example after the heat treatment and before the manufacturing, the cable or only the tube has been stretched or has been pulled, which occurs for example when winding onto a drum and unwinding. A strain thereby introduced into the plastic may sometimes not relax until it is in the installed state or in the course of use, and is not directly discernable during manufacture.

In another manufacturing method, the clad is jointly pushed into the sleeve and fixed with a form fit by the action of a mechanical force, for example by so-called crimping by special crimp sleeves and associated tools and/or in addition adhesively (materially) bonded thereto. In this case crimp sleeves made of metal, usually brass, nickel silver or stainless steel are externally deformed in a defined way by special tools during the mounting of such fiber-optic cables, and they engage in and fix the clad. During the deformation of the metal sleeve, however, high external forces act on the underlying clad tube and on the fiber bundle. The consequences are fiber fractures thereby induced, which can lead to rejection of the component part when a specified number of broken fibers is exceeded.

Cable clad materials which need to be chemically and/or thermally particularly stable for their use are particularly problematic. These include in particular clad plastics made of polyolefins, for example polyethylene, polypropylene or compounds thereof, or fluorinated or partially fluorinated plastics, for example fluorinated ethylene propylene (FEP), ethylene tetrafluoroethylene copolymer (ETFE), or polytetrafluoroethylene (PTFE). Although these have a very good fitness for use in industrial and medical technology applications, they have the disadvantage that the surface energy, in particular the polar component of the surface energy, is very low and therefore sufficiently good wettability or adhesion cannot be ensured. In other words the adhesive used, which may be particularly suitable for adhesion on or to the sleeve material, does not hold or does not adhere, or does not adhere sufficiently, to or on the material of the cladding of the fiber or of the fiber bundle. The clad material is thus chemically incompatible or not very compatible with the adhesive and/or the material of the sleeve since the surface energies, in particular their polar components, differ substantially. The consequence is that by after-shrinkage of the clad plastic a certain time later the adhesive bond yields, a gap is formed and the fibers are at least partially unprotected, so to speak denuded.

Although an at least improved and sometimes sufficiently strong adhesive bond may be ensured by the use of chemical and/or physical pretreatment methods for surface activation, for example preconditioning with sulfuric acid or a plasma pretreatment of the surface of the tube material and/or the sleeve directly before the adhesive bonding, this entails considerable interference in the production processes. Such pretreatments also include fluorine gas treatment or coating. Although the latter is permanent, it enters into a reaction with the fiber bundle (glass and/or sizing agent) so that it becomes undesirably discolored, for example yellowish or brownish.

SUMMARY OF THE INVENTION

What is needed in the art is a way to provide a mounting device which allows secure and therefore tight and permanent fixing of a light-guide cable even when using poorly wettable clad materials having a low chemical compatibility. That is to say, it allows material pairings of or with clad materials which are chemically not very compatible or are incompatible, or chemically do not correspond or correspond little, with sleeve materials and/or adhesives. In addition, the mounting of a light-guide cable is intended to be possible substantially without mechanical stress of the light-guide fibers.

In some embodiments provided according to the present invention, a mounting device for a fiber-optic cable is provided. The fiber-optic cable comprises a light guide comprising or consisting of at least one optical fiber or a bundle of a plurality of optical fibers and a cladding which fully encloses the light guide at least in portions on its outer circumferential face. The mounting device is formed from one piece or from a first segment and a second segment, and has a first fixing portion and a second fixing portion, which is spatially separated from the first fixing portion. The second fixing portion is arranged substantially concentrically around the first fixing portion. The light guide is connected or connectable at least partially or in portions materially to the first fixing portion and the cladding is connected or connectable to the second fixing portion at least partially or in portions with a form fit, with a force fit and/or materially, so that the fixing of the light guide and the fixing of the cladding on the mounting device are separated or separable from one another.

In some embodiments provided according to the present invention a use of a mounting device is provided for industrial or medical technology cables comprising fiber-optic light guides for transmission of light or images each comprising or consisting of at least one optical fiber or a bundle of a plurality of optical fibers and a cladding which fully encloses the light guide at least in portions on its outer circumferential face, a material of the cladding having a surface with a surface energy for its polar component of less than equal to 1 $mJ/m^2$. The mounting device is formed from one piece or from a first segment and a second segment, and has a first fixing portion and a second fixing portion, which is spatially separated from the first fixing portion. The second fixing portion is arranged substantially concentrically around the first fixing portion. Each light guide is connected or connectable at least partially or in portions materially to the first fixing portion and the cladding is connected or connectable to the second fixing portion at least partially or in portions with a form fit, with a force fit and/or materially, so that the fixing of each light guide and the fixing of the cladding on the mounting device are separated or separable from one another.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

Figure 1:
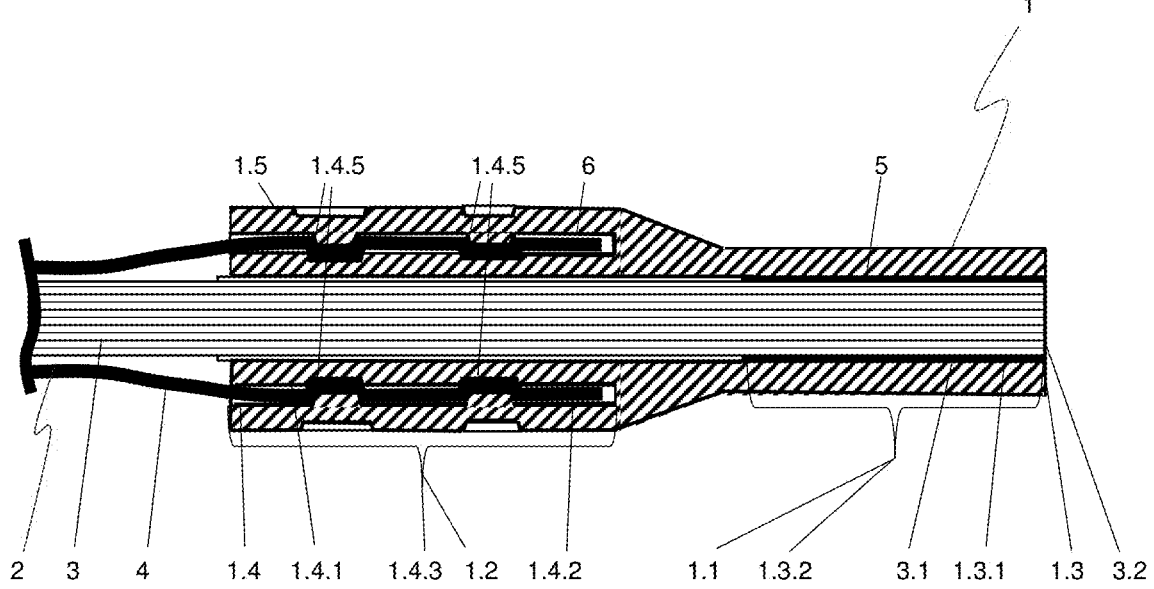
FIG. 1 schematically shows an integral embodiment of a mounting device provided according to the invention.

DETAILED DESCRIPTION OF THE
INVENTION

The invention provides a mounting device for a fiber-optic cable, wherein the fiber-optic cable comprises a light guide comprising or consisting of at least one optical fiber or a bundle of a plurality of optical fibers, and a cladding which fully encloses the light guide at least in portions on its outer circumferential face. The mounting device is formed from one piece or from a first and a second segment, and has a first fixing portion and a second fixing portion, which is spatially separated from the first fixing portion.

The second fixing portion is arranged substantially concentrically around the first fixing portion. Further, the light guide is connected or connectable at least partially or in portions materially to the first fixing portion and the cladding is connected or connectable to the second fixing portion at least partially or in portions with a form fit, with a force fit and/or materially, so that the fixing of the light guide and the fixing of the cladding on the mounting device are separated or separable from one another.

Such a design measure makes it possible that different fixing or connecting methods may be employed, depending on the clad material, and independently thereof as well as spatially separately, the fibers or the fiber bundle of the light guide can be mounted securely and permanently reliably without damaging the fibers.

An exemplary mounting device for a fiber optic cable is known from German Patent Application No. DE 10 2016 116 409 A1. While the mounting device from German Patent Application No. DE 10 2016 116 409 A1 includes two fixing sections, the device from German Patent Application No. DE 10 2016 116 409 A1 does not have a cladding that is connected or connectable to the second fixing portion at least partially or in portions with a form fit, with a force fit and/or materially so that the fixing of the light guide and the fixing of the cladding on the mounting device are separated or separable from one another.

In the context of the invention, light guides or fiber-optic light guides in special embodiments also include image guides and fiber-optic image guides or combinations thereof. The terms light-guide fibers, optical fibers, individual light guides and fibers or individual fibers may be used synonymously.

Material connections generally refer to all connections in which the connection partners are held together by atomic or molecular forces. They are at the same time nonreleasable connections, which cannot be separated without destruction of the connection partners.

A form fit and/or a form-fit connection generally means a type of mechanical connection in which two or more parts engage in one another or fit together because of their geometrical shapes. In a form-fit connection, the shape of the parts prevents a relative movement in at least one direction.

Force-fit connections are generally understood to result from the application of force. This includes for example pressure forces or friction force. The force-fit connection is held together purely by the force acting. Often, a form fit and a force fit act together.

According to the invention, in some variants of the mounting device, alternatively or in addition the mounting device is configured as an integral component, the first fixing portion being formed by a substantially central opening of the mounting device. The opening has an inner circumferential face and a length L1, and is intended to receive the light guide. The second fixing portion is formed by a substantially annular cavity around the central opening, the cavity having a depth of length L2, an inner circumferential face and an outer circumferential face, and being intended to receive the cladding.

In this way, spatial separation may be achieved for the fixing of the cladding, on the one hand, and fixing of the fiber or the fiber bundle, on the other hand. The formation of such a cavity also allows a substantially larger fixing area, which is formed by the inner circumferential face of the cavity, in particular the entire inner circumferential face.

In the context of the invention, the term integrally is meant synonymously with "from one piece" or one-piece, which may also include the component comprising or consisting of one material or one material class. Further, an annular cavity likewise means a cavity which is configured circumferentially around the central opening and in general substantially follows the geometry of the opening or the mounting device geometry in cross section. It is, however, also conceivable that the opening or the mounting device is configured for example rectangularly at least partially or in portions and the cavity nevertheless extends circularly or differently from the other geometries, or conversely with otherwise round geometries the cavity assumes a profile precisely differing therefrom.

In some embodiments of the mounting device, alternatively or in addition thereto the light guide of the fiber-optic cable is connected or connectable by a first adhesive to the first fixing portion on its inner circumferential face at least partially or in portions, and/or the cavity of the second fixing portion has on its inner circumferential face and/or on its outer circumferential face, in the region of the depth L2, at least one deformation to which the cladding of the fiber-optic cable is fixed or fixable at least partially or in portions with a form fit.

The cladding is therefore mechanically fixed in such a way that, even without any further adhesive bonding, it cannot slip out as a result of bending stresses of the cable and/or by shrinkage of the clad material, as mentioned in the introduction. Additional adhesive bonding may in this case be used for supplementary fixing and/or sealing. This is also advantageous when clad materials that adhesively bond poorly are employed.

In some embodiments, alternatively or in addition, the deformation may be arranged or arrangeable radially circumferentially on the inner circumferential face and/or on the outer circumferential face of the second fixing portion. Also, the deformations may optionally in addition be arranged corresponding with one another on the inner circumferential face and on the outer circumferential face of the second fixing portion. Secure mechanical fixing may thus be ensured by clamping or pinching of the cladding by the deformations. Furthermore the connection of the cladding onto the second fixing portion, or in and/or to the cavity, may comprise or consist of a thermal and/or press or crimp connection or a combination thereof, or be configured or configurable as such. Mechanically resilient, permanent fixing of the cladding onto the second fixing portion, or in and/or to the cavity, may therefore be obtained.

For this purpose, for example, methods such as ultrasonic welding and/or friction welding may be used. Thermal connections include connections that are achieved by heating at least one material of the materials to be connected by input of thermal energy, or heat, in such a way that it deforms and/or melts, i.e. becomes semi-fluid or even fluid. This may take place over the entire or complete faces of the portions to be connected, for example by exposure to hot air or a corresponding oven or muffle oven, but also in a locally restricted or limited way, as may be provided or achieved at least as part of the method steps or method parameters in the aforementioned methods of ultrasonic welding or friction welding. The use of corresponding laser-based methods may also be envisaged here.

In some embodiments, the integral mounting device may alternatively or in addition be configured in such a way that the first fixing portion is formed by a substantially central opening of the mounting device. The opening has an inner circumferential face and a length L1, and is intended to receive the light guide. Furthermore, the second fixing portion for receiving the cladding is formed at least in portions along the length L2 of the outer circumferential face. In this way, with the same or at least similar mechanical stability, particularly in the region of the second fixing portion, the mounting device may be configured to be thinner, i.e. for example with a smaller diameter, than in the above-described variant with a cavity. Besides reduced use of material, this may be advantageous particularly in applications of a light guide mounted in such a way which are critical in terms of installation space.

In this variant of the mounting device, the light guide of the fiber-optic cable is optionally connected or connectable by a first adhesive to the first fixing portion on its inner circumferential face at least partially or in portions. Optionally, the cladding of the fiber-optic cable is fixed or fixable by a second adhesive to the second fixing portion on its outer circumferential face at least partially or in portions. Advantageously, the mounting of the fiber-optic cable is thereby made possible in a simplified way with at the same time separate connections of the light guide and the cladding. In this embodiment, the mounting device may consist of or comprise plastics, for example as an injection-molded part, or of metal such as stainless steel, aluminium, brass, nickel silver or further alloys or combinations thereof. It is in this case important that both the first and the second adhesive are selected to suit the light guide, or the cladding, and the material of the mounting device, so that a secure and tight connection is ensured. Typically, polycarbonate (PC), polymethyl methacrylate (PMMA) or acrylonitrile butadiene styrene copolymer (ABS), or polymers or compounds based thereon, may be used for the mounting device, and these may then be combined with particular materials for the cladding. Optionally, materials that are chemically similar to the polymer of the mounting device, and vice versa, are then used for the cladding. Typical representatives of such materials for the cladding are, for example, polyurethanes, polyamides or polyvinyl, or polymers or compounds based thereon. Depending on the materials selected or specified, the first and the second adhesive may be different, although they may also comprise or consist of the same or similar material classes, for instance variants of epoxides. Differences may consist not only in the material class of the adhesives per se, but also in their properties, for example thermal expansions matched to the joining partners, or optical properties such as transmission or color. Similarly, this is also to be taken into account for or in the combination of metals for the mounting device, the material of the light guide, the material of the cladding and the first and/or second adhesive, i.e. they should be selected so that they are suited to one another.

Alternatively or in addition, in this variant of the mounting device the connection of the cladding onto the second fixing portion may comprise a thermal and/or press or crimp connection or a combination thereof. A further-improved connection of the cladding onto the second fixing portion may thus advantageously be achieved.

In order further additionally and advantageously to configure the connection of the cladding onto the second fixing portion with a form fit, the latter may have at least one deformation, to or in which the cladding of the fiber-optic cable is fixed or fixable at least partially or in portions. Optionally, this deformation of these deformations is or are arranged radially circumferentially on the outer circumferential face of the second fixing portion. This further contributes to a secure and tight connection of the cladding onto the second fixing portion, in which case the form-fit fixing in the recesses may be reinforced during the curing of the adhesive in question by suitable action of forces.

Another embodiment of the mounting device provides, alternatively or in addition, a two-part construction having a first segment and a second segment, i.e. comprising these two segments. The first fixing portion is formed by a substantially central opening of the first segment, the opening having an inner circumferential face and a length L3, and being intended to receive the light guide. Furthermore, the second segment has a substantially central opening, which is intended for feeding the light guide through, and the second fixing portion, the second fixing portion having an outer circumferential face of length L4 for applying the cladding at least partially or in portions. Alternatively or in addition, both the first segment and the second segment each have a connecting region for mechanically connecting the two segments substantially with a force and/or form fit at least partially or in portions, so that a connecting zone or connecting region, in particular a screw, latch or bayonet connecting region, is formed or formable in the connected state.

It may be advantageous in this case that different materials may be used for the fixing of the fibers of the light guide and for the fixing of the cladding. In other words the materials that the first and the second segments comprise, or of which they consist, differ. The first segment may therefore be intended for connection to the fibers at least partially or in portions. The second segment may be intended for connection to the clad or tube at least partially or in portions. The materials of the segments may thus be matched to the respective fixing or joining partner, or tailored thereto. In particular, the matching, identicality or similarity and/or compatibility of the properties, particularly of the surfaces of the materials, may be important. Thus, for example and in particular, the material of the second segment is optionally selected so that it is at least similar to the material of the cladding of the fibers. If the cladding comprises or consists of a plastic of the class of polypropylenes, for example, the second segment should also be selected from the class of polypropylenes and compounds thereof, or should at least be similar thereto or chemically compatible therewith. In other words, the materials of the cladding and of the second fixing portion correspond, or substantially correspond. Besides the class of the materials and further material properties (thermal, for example temperature stability, thermomechanical, such as thermal expansion, etc.), the chemical compatibility may in particular also or precisely be given or specified by the wetting behaviour, described by the surface energy, and in this case particularly of the polar component. If the values in particular of the polar component of the surface energy are close to one another, there is, or is expected to be, a good or high chemical compatibility. With a suitable selection of the adhesive, a good adhesive bond is thus also possible. Good chemical compatibility of the first segment with the fibers fixed therein by the first adhesive is also important.

For instance, plastic-plastic combinations may be envisaged, in particular for fixing the clad on or to the second segment, in respect of different, optionally similar or equal surface energies. For fixing the fibers in or to the first segment, metal may also be used for the first segment, for example stainless steel, brass, nickel silver or aluminium and alloys thereof, so long as suitable i.e. chemically compatible first adhesives are available. Typical representatives of such adhesives are one-component (1K) or two-component (2K) epoxides or one-component (1K) or two-component (2K) silicones. The plastics selected, or used, for the first and/or second segment may also comprise or consist of opaque, translucent and/or optically clear, transparent plastics or combinations thereof. Here, in the context of the invention, optically clear, transparent means that a material, here for example the first adhesive, has no intrinsic color and does not have a scattering effect in the wavelength range of the intended light that passes through the material in an operating state and causes no attenuation, or at least no substantial attenuation, of this light passing through, i.e. for example it has at least a transmission of 80% at a thickness of 1 mm for these wavelengths, or in this wavelength range. The relevant intended wavelength range in which the mounting device may be employed for a fiber-optic cable of the invention is determined by the addressed application of the fiber-optic cable, or of the light guides, and may lie in the visible (VIS), infrared (IR) and/or ultraviolet (UV) wavelength range of the electromagnetic spectrum, or at least sections thereof.

Thus, if the material of the cladding substantially corresponds to the material of the second segment, or is very similar thereto in respect of its thermal, mechanical and in particular chemical properties, or is compatible therewith, this makes it possible for the connection of the cladding onto the second fixing portion of the second segment to be formed or formable as a thermal and/or ultrasonic or friction welding connection or a combination thereof. The first segment, which is used for fixing the fibers of the light guide, may in this case furthermore consist of metal, which allows reliable adhesive bonding with conventional epoxy adhesives.

In some embodiments, accordingly, alternatively or in addition the mounting device is configured in such a way that the material of the cladding corresponds to the material of the second segment and the cladding is connected or connectable onto the second fixing portion of the second segment at least partially or in portions with a force and/or form fit, in particular a thermal and/or ultrasonic or friction-weld connection or a combination thereof, or is configured or configurable as such a connection.

In a two-part mounting device, as described above, in some configurations, alternatively or in addition the first segment and the second segment may be connected or connectable releasably to one another via their connecting regions by a latch or clip connection, a bayonet connection or a screw connection.

In some embodiments, the first segment and the second segment may in this case also form a clamping region on or around their connecting zone for receiving and mechanically fixing the cladding of the light guide, i.e. a clamping region may be formed there. This clamping region may be used for further fixing of the cladding and at the same time also for further sealing. Further, the design of the two segments may optionally be configured in such a way that there is security against twisting. That is to say, the fiber bundle fixed in the first segment cannot be twisted during mounting or use, or at least cannot be twisted excessively, relative to the cable clad fixed in or on the second segment or relative to one another. Fiber fracture, or fiber fracture due to twisting, can therefore at least be precluded or prevented.

In some embodiments of the mounting device, the light guides comprise or consist of polymer optical fibers (POF), glass-based optical fibers (GOF) and/or quartz-based optical fibers. Combinations of these optical fibers may also be envisaged so that versatile applications with different requirements for the transmission of light and/or images can be addressed.

The first adhesive optionally provided alternatively or in addition for the mounting and fixing of the fibers in or on the first fixing portion comprises or consists of 2K epoxy adhesives or 1K or 2K silicone adhesives. These are sufficiently widely available in variants, which makes it possible to connect the different materials of fibers and the associated fixing portion reliably. Such adhesives are established in the industrial sector and are often also approved in the medical sector.

In further embodiments of the mounting device, alternatively or in addition the cladding may be connected or connectable to or around the second fixing portion and/or to the cavity by a second adhesive. The second adhesive may differ from the first adhesive in respect of the chemical composition and curing mechanisms. For instance, the second adhesive may rather have a flowable, or soft, consistency since it is intended more for supplementary fixing or for further sealing purposes. The first adhesive, on the other hand, should be harder, or more brittle. The first adhesive may in particular also be transparent and colorless, whereas the second adhesive may in particular be opaque and colored (brightly or neutrally). If a transparent material is used for the integral device or the first segment, it may also be advantageous for the first adhesive to be opaque or colored at least in portions, for example in order above all to avoid, or at least suppress, entry of scattered light into these transparent materials. Also, the first adhesive may be matched in respect of its refractive index to that of the light guide, or may differ therefrom only a little, for example $\Delta n \leq 0.1$. This reduces reflection losses at associated interfaces. In respect of the processing, it may also be advantageous for the first adhesive in particular to have a low viscosity or self-levelling flow properties during application and to be processable, or curable, in such a way that it is crosslinked by UV light and/or heat. The second adhesive for any additional fixing of the cladding therefore optionally differs from the first adhesive with which the light guide is adhesively bonded into the sleeve of the mounting device.

In addition or alternatively, in some developments of the mounting device at least the inner circumferential face of the first fixing portion and/or the inner circumferential face and/or the outer circumferential face of the second fixing portion may have a chemical or physical surface activation and/or at least one adhesion promoter layer. The bonding ability, or adhesion, of the adhesives may thus be matched to the materials and optimised.

Further, in some variants of the mounting device, alternatively or in addition it may also be advantageous for at least the inner circumferential face of the first fixing portion and/or the outer circumferential face of the second fixing portion to have a chemical or physical surface activation and/or at least one adhesion promoter layer.

In terms of design, in some embodiments of the mounting device it may also be advantageous alternatively or in addition for the first fixing portion to have a conical portion in the delivery direction of the light guide on its inner circumferential face. Likewise optionally, the mounting device may alternatively or in addition have rounded edges in the delivery direction of the light guide. Both are conducive to the threading or insertion of the fibers into the first fixing portion during the mounting process.

In a further embodiment of the mounting device, in addition or alternatively the opening of the first fixing portion may optionally be closed off on one side in the delivery direction of the light guide at the end in the region of the end face, and the mounting device may at least in this region comprise or consist of a transparent material, and a cone for the insertion of the fibers may be provided in on the first fixing portion on the inner circumferential face. Economical terminations of the light guide may therefore be produced by using flowable transparent adhesives without an additional grinding and polishing process. This modification may be used both for an integral embodiment and for a 2-part embodiment of the mounting device.

An exemplary use of the mounting device comprising the features, or alternative embodiments, described above involves use for industrial or medical technology cables comprising fiber-optic light guides for transmission of light or images, particularly in the operating state of the application, in which the material of the cladding has a surface with a surface energy for its polar component of less than equal to 1 mJ/m$^2$, i.e. a low wetting capability, and in particular consists of or comprises polyolefin plastics (for example PE, PP, PE-PP compounds) and/or fluorinated or partially fluorinated plastics (for example FEP, ETFE). As mentioned in the introduction, these materials have a high chemical and/or thermal stability, are mechanically particularly robust and flexible, and have in particular smooth, non-tacky haptics because of their low polar surface energy. With the configuration of the mounting device provided according to the invention, secure fixing of the clad of the light guide can be ensured and release of the connection of the clad and the sleeve can be prevented, so that the service life of such a component can be increased.

Referring now to the drawings, FIG. 1 schematically shows an integral embodiment of a mounting device 1 provided according to the invention, configured as a sleeve, for a fiber-optic cable 2, the fiber-optic cable 2 comprising a light guide 3, which consists of at least one optical fiber or a bundle of a plurality of optical fibers, and a cladding 4 which fully encloses the light guide 3 at least in portions on its outer circumferential face 3.1. The sleeve in this exemplary embodiment has a first fixing portion 1.1 in the form of a central through-opening 1.3 in the form of a bore and a second fixing portion 1.2, which is spatially separated from the first fixing portion 1.1. The second fixing portion 1.2 is arranged substantially concentrically around the first fixing portion 1.1. It is represented here that the fibers, or the fiber bundle, of the light guide 3 are connected at least partially or in portions materially by a suitable first adhesive 5 to the first fixing portion 1.1 and the cladding 4 is connected to the second fixing portion 1.2 at least partially or in portions with a form fit, with a force fit and/or materially, so that the fixing of the light guide 3 and the fixing of the cladding 4 on the mounting device 1 are separated or separable from one another.

The first fixing portion 1.1 inside the central opening 1.3 of the sleeve is substantially defined by the inner circumferential face 1.3.1 of the latter and a length L1, 1.3.2, over which the adhesive extends. The second fixing portion 1.2 is formed by a substantially annular cavity 1.4 around the central opening 1.3, the cavity having a depth of length L2, 1.4.3, an inner circumferential face 1.4.1 and an outer circumferential face 1.4.2, into which the cladding 4 can be inserted during the mounting.

The actual fixing of the light guide 3 takes place by adhesive bonding of the fibers, or the fiber bundle, with the first adhesive 5 in the first fixing portion 1.1 and by deliberate mechanical deformation of the cavity 1.4 with the cladding 4 in the region of the second fixing portion 1.2 by an external action of a force on the sleeve in the region of the second fixing portion 1.2, so that at least one deformation 1.4.5 is achieved on its inner circumferential face 1.4.1 and/or on its outer circumferential face 1.4.2 in the region of the depth L2, 1.4.3. Usually, the deformations 1.4.5 on the inner circumferential face 1.4.1 and on the outer circumferential face 1.4.2 of the second fixing portion 1.2 are arranged corresponding with one another. The cladding 4 of the fiber-optic cable 2 may therefore be fixed at least partially or in portions with a force fit and/or with a form fit owing to the deformation, or the undercut region 1.4.5.

In further variants, the at least one deformation 1.4.5 may be arranged radially circumferentially on the inner circumferential face 1.4.1 and/or on the outer circumferential face 1.4.2 of the second fixing portion 1.2.

Such deformations may be produced by a thermal and/or press or crimp connection or a combination thereof. It is also conceivable to produce them by ultrasonic methods, in particular of the sonic welding. Also, the cladding 4 may be fixed in or around the cavity 1.4 by a second adhesive 6 which is used in particular for sealing. This second adhesive 6 may have very different properties from the first adhesive 5, and may for example be flowable, permanently elastic or extensible, which would rather be disadvantageous for fiber fixing in the fixing portion 1.1. After curing, the first adhesive 5 may have a certain brittleness in order to favor any processing of the front face or end face 3.2 of the sleeve, which may be achieved by employing epoxide adhesives. The second adhesive 6 may consist of comparatively soft silicone adhesive.

Lastly, the end face 3.2 of the light guide 3, including the sleeve, is subjected to a grinding and polishing process so that a smooth surface can be formed, as is shown in FIG. 1. Insofar as this is required or specified or provided by the subsequent application, the end face 3.2 may also have a nonplanar shape, for example a concave or convex curvature or a free-form face. The coupling of light in or out may thus be modified, or adapted.

Figure 1A:
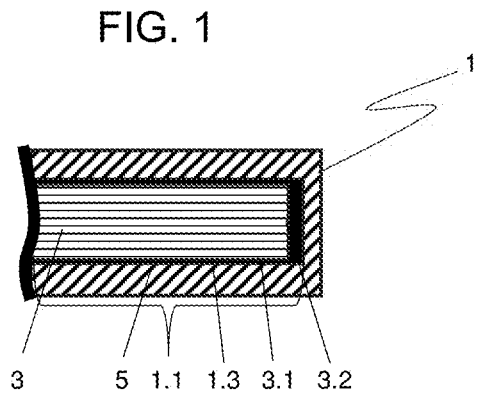
FIG. 1A schematically shows a detail of a configuration variant.

In one variant, the opening 1.3 may also be closed in the region of the end face 3.2 of the light guide 3, as is schematically shown in a detail in FIG. 1A. For this purpose, the sleeve (mounting device 1) at least in this portion is transparent and externally has a smooth surface for optimal coupling of light in or out. This may be achieved particularly well if the sleeve is made of an e.g. injection-moldable, highly transparent optically clear plastic, for example polycarbonate, or in a 2-stage injection-molding process at least the region on the end face 3.2 of the light guide 3 consists of transparent material and the rest of the sleeve consists for example of an opaque material. Here, flowable, highly transparent thermally and/or UV-curing adhesives in particular are employed as the first adhesive 5. With a view to avoiding Fresnel losses and scattering effects, it may in this case be particularly advantageous for the refractive index of the cured first adhesive 5 to correspond to that of the transparent sleeve material and that of the fibers. An elaborate grinding and polishing process may therefore be obviated, which may be advantageous in particular for light-guide cables in cost-sensitive applications. This approach is based on DE 10 2008 044 938 B4. Adhesively bonding a transparent disc onto or into the end face in the form of a disc of glass or plastic as well as a nonplanar shape of the end face, as described above, may also be envisaged. It is furthermore conceivable (not explicitly represented in FIG. 1) that the cladding is also applied or fitted, or can be applied, on the outer circumferential face 1.5 at least partially or in portions along the length L2, 1.4.3. In this variant, the cavity may optionally be obviated. The application of the cladding may also extend beyond the length L2, 1.4.3. Deformations 1.4.5, such as are shown in FIG. 1 on the outer lateral face 1.5 in the region of the length L2, 1.4.3, may also be present in this case and, besides material adhesive bonding of the cladding 4 on the second fixing portion 1.2, additionally allow a form fit that at least reinforces the connection.

Figure 2:
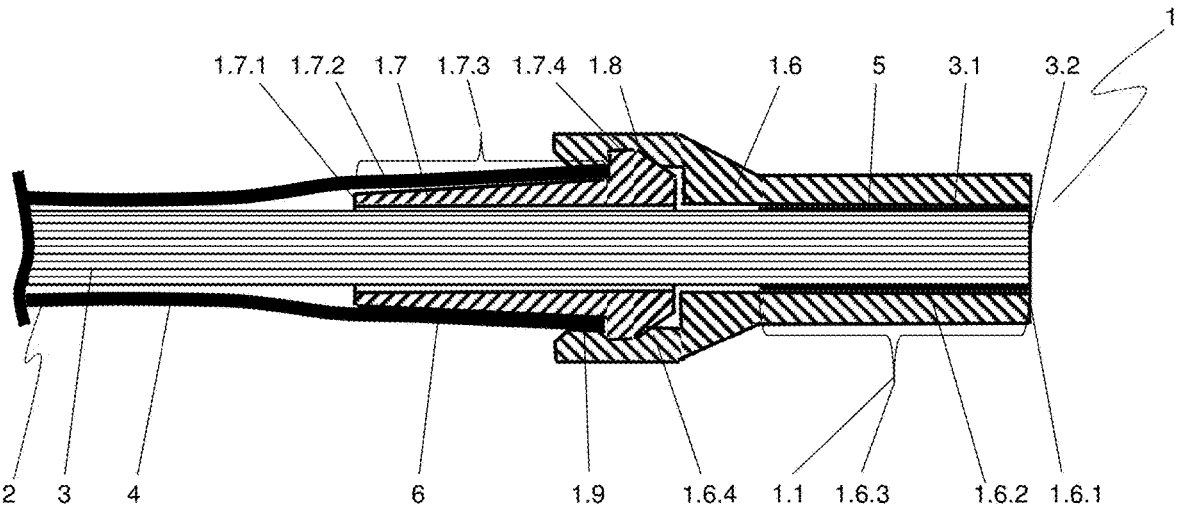
FIG. 2 schematically shows a two-part embodiment of the mounting device.
Figure 3:
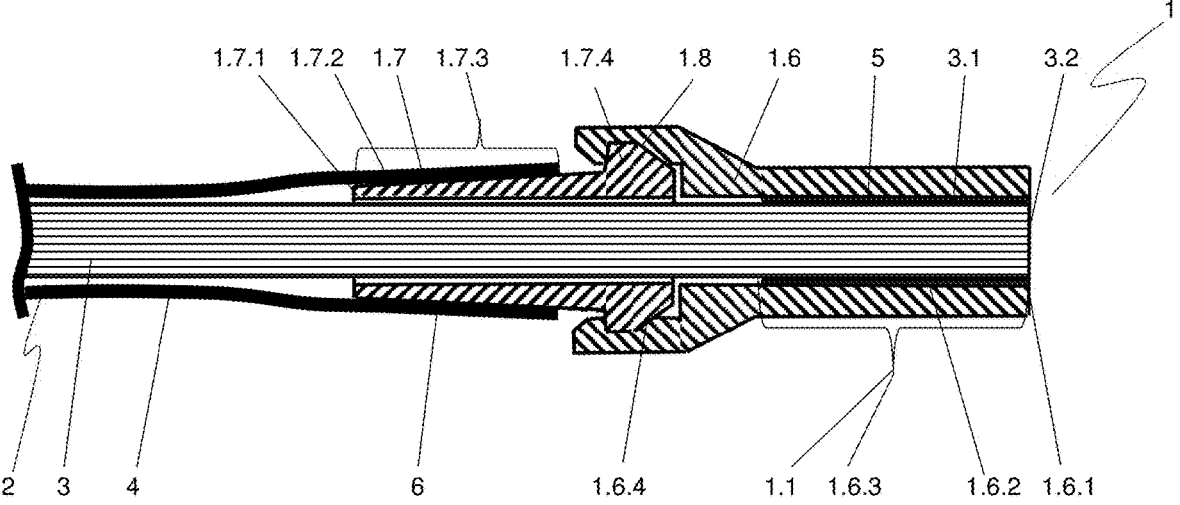
FIG. 3 schematically shows a further variant of a two-part embodiment of the mounting device.

FIGS. 2 and 3 respectively show further variants of the mounting device 1, in these cases the mounting device 1 configured as a sleeve being formed in two parts consisting of a first segment 1.6 having the first fixing portion 1.1 for the fibers, or fiber bundle, and a second segment 1.7 having the second fixing portion 1.2 for fixing the cladding 4.

The first fixing portion 1.1 is formed by a substantially central opening 1.6.1 of the first segment 1.6. In general, this is a through-bore having a circular cross section, the opening 1.6.1 having an inner circumferential face 1.6.2 and a length L3, 1.6.3, and being intended to receive the fibers, or the fiber bundle, of the light guide 3. The second segment 1.7 has a substantially central opening 1.7.1 for feeding the light guide 3 through, as well as the second fixing portion 1.2. Here, the second fixing portion 1.2 is an outer circumferential face 1.7.2 of length L4, 1.7.3, which is used at least partially or in portions for applying, or fixing, the cladding 4.

Both segments 1.6, 1.7 of the mounting device 1 have connecting regions 1.6.4, 1.7.4, via which a stable mechanical connection of the two segments 1.6, 1.7 can be ensured at least partially or in portions. This may on the one hand be a screw connection, in which the connecting regions 1.6.4 and 1.7.4 are configured as mutually corresponding screw threads, or a latch connection, as is shown by way of example in FIGS. 2 and 3. This connecting region 1.8, in particular a screw or latch connecting region, may be configurable in such a way that it is formed so that it cannot be released, or can be released only with a special tool. Also, further sealing ways that prevent ingress moisture may be provided. In the case of a screw connection, this may, for example, be a simple sealing ring. In the case of a latch connection, it may for example also be an additional adhesive or a sealing compound.

The variant represented in FIG. 2 shows a 2-part sleeve in which the first segment 1.6 and the second segment 1.7 are connected releasably to one another via their connecting regions 1.6.4, 1.7.4, the first segment 1.6 and the second segment 1.7 forming a clamping region 1.9 on or around their connecting clamping regions for receiving and mechanically fixing the cladding 4 of the light guide 3. This clamping region 1.9 may, for example, have circumferential grooves or teeth, which ensure secure holding of the cladding 4 and also seal this region. Besides latch or clip connections, a bayonet connection and/or screw connection may also be envisaged. Depending on the field of application, as already mentioned above, a connection that can be released only with difficulty or with a special tool, or a connection that is nonreleasable, or no longer releasable, after the initial connecting may be provided.

In the variant shown in FIG. 3, a latch or clip connection is likewise shown between the segments 1.6, 1.7. Here, however, the material of the cladding 4 is identical, or corresponds or is at least similar, to the material of the second segment 1.7 in respect of their material classes so that by a thermal and/or ultrasonic or friction welding connection, or a combination thereof, secure fixing of the cladding 4 to the second segment 1.7 in the region of the second fixing portion 1.2 can be formed, or is formable, in order to ensure secure permanent fixing.

Regarding the alternative embodiments of the mounting device that are shown, it should also be noted that the openings 1.3, 1.61, 1.7.1 are usually arranged centrally in the sleeve, or in the sleeve segments, and usually bores. Nevertheless, other noncentral arrangements as well as noncircular openings 1.3, 1.61, 1.7.1 may also be envisaged, in particular when, for example, a plurality of fibers or a fiber bundle are configured on its end face 3.2 for example as a rectangle, an n-gon, as a ring or one or more annular, annular segment-shaped, lunate, reniform or arbitrarily shaped regions, or need to be fanned out. Also, the variants shown in FIGS. 2 and 3 may likewise be implemented as is shown in FIG. 1A and has already been described in relation thereto.

FIGS. 4 to 7 represent side views through further variants of such mounting sleeves configured as a mounting device 1.

Figure 4:
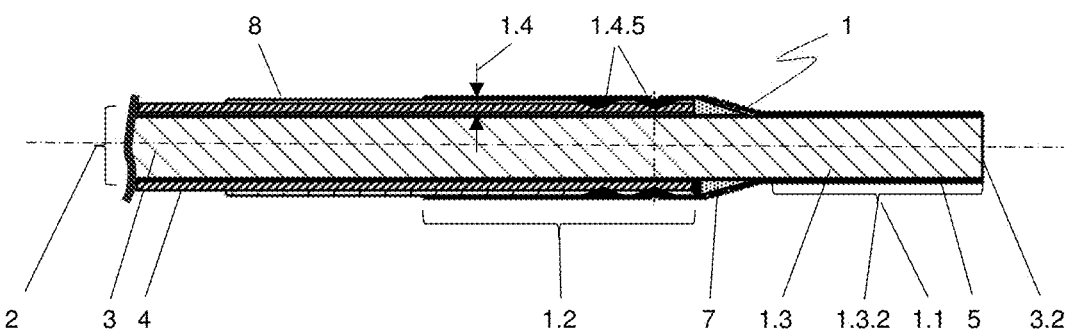
FIG. 4 shows a sectional view of a corresponding configuration variant of the mounting device provided according to the invention.

FIG. 4 shows a mounting device 1 configured as an integral mounting sleeve for the fiber-optic cable 2 comprising the light guide 3, which is formed by a fiber bundle, and its cladding 4. This mounting device 1 may, for example, consist of stainless special steel or a polar plastic that adhesively bonds well (for example PPS or PPSU). In order to mount the light guide 3 in the region of the first fixing portion 1.1 of the mounting device 1, the fiber-optic cable 2 has previously been separated from its cladding 4 at its end over at least a length L1, 1.3.2, so that the free end is bonded by the adhesive 5 in the region of the opening 1.3 of the mounting device 1. The end face 3.2 of the light guide 3 may, depending on the optical requirements, be ground and polished or only sawed with a fine saw blade, and therefore have a certain residual roughness.

In order to fix the cladding 4 of the fiber-optic cable 2, in this alternative embodiment the mounting device 1 configured as a mounting sleeve is widened at least in the region of the fixing portion 1.2 so that an annular cavity 1.4 is formed around the fiber-optic cable 2, into which the fiber-optic cable 2 with an additionally fitted sleeve 8 can be inserted as far as the narrowing of the mounting device 1. The additionally fitted sleeve 8 and the cladding 4 are optionally produced from the same material class so that they can be welded to one another at least over the fixing region 1.2. The fixing of the cladding 4 to the additional sleeve 8 takes place, for example, by ultrasonic welding and/or one or more circumferential deformations 1.4.5, or indentations, crimps, of the mounting device 1 so that corresponding undercut regions 1.4.5 and therefore additional latchings that ensure sufficiently firm mechanical fixing are formed in this region.

Figure 5:
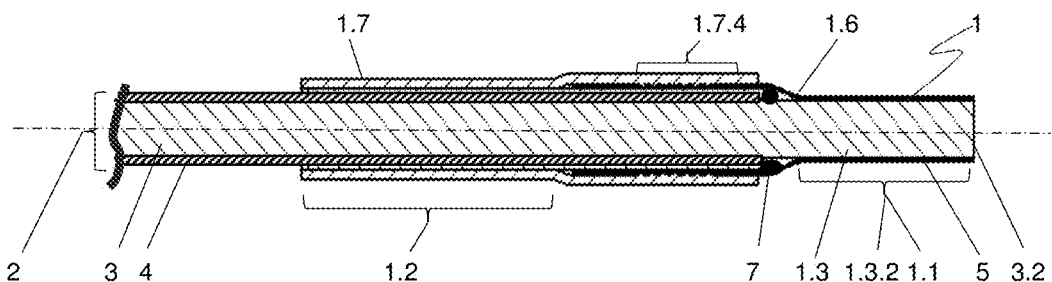
FIG. 5 shows a sectional view of another corresponding configuration variant of the mounting device provided according to the invention.

In order to increase the leaktightness, an additional sealing region 7 may be provided in the transition region between the two fixing portions 1.1 and 1.2, which as shown in FIG. 4 is formed by injection of, for example, epoxy adhesive material. Alternatively or in combination, an O-ring may be provided as additional sealing. FIG. 5 shows, for example, a variant comprising an O-ring as a sealing region 7.

As already remarked above, the additional sleeve 8 may consist of the same material class as the cladding 4, although it may be configured to be harder than the cladding 4 in respect of its Shore hardness so that the sleeve 8 can absorb additional forces during the welding/pressing process and the fiber bundle of the light guide 3 can be additionally protected, which prevents fiber fractures.

The following table shows a selection of exemplary claddings 4:

| Plastic types | Typical Shore A hardnesses | Typical Shore D hardnesses |
| --- | --- | --- |
| PC | | 82 to 85 |
| PVC | | 75 to 80 |
| PMMA | | 52 to 88 |
| COC | 82 to 93 | |
| FEP | | 55 to 60 |
| PFA | | 60 to 65 |
| ETFE | | 67 to 73 |
| THV | | 44 to 58 |
| PVDF | | 70 |
| PA | | 75 to 85 |
| PE | | 45 to 60 |
| PP | | 65 to 75 |
| LDPE | 95 to> | 40 to 50 |
| LLDPE | 75-95 | |
| LLDPE/PP | 75-95 | |
| TPE/S | 10 to> | 70 |
| TPE/E | | 40-78 |
| TPE/U | 85 to> | 74 |
| ABS | | 75 to 80 |
| POM | | 81 |

The variant shown in FIG. 4 has, for example, the following typical dimensions:

length L1, 1.3.2, of the first fixing portion 1.1 typically 7.5 mm length of the second fixing portion 1.2. about 12 mm to 20 mm, typically about 15 mm to 17 mm fiber bundle diameter of the light guide 3 in the example shown 3.0 mm overall diameter of the mounting device 1 in the region of the second fixing portion 1.2 in the example shown 3.6 mm FIG. 5 shows as a further example of a two-part mounting device 1 a first segment 1.6 of the mounting device 1, which is configured as a metal sleeve, and a second segment 1.7, which is configured as a plastic sleeve, the material class of which is similar to, or ideally the same as, that of the cable clad 4 the fiber-optic cable 2. In this case, the light guide 3 of the fiber-optic cable 2 is adhesively bonded in the first fixing portion 1.1, in the opening 1.3 for receiving the fiber bundle over the length L1, 1.3.2, to the metal sleeve (first segment 1.6) by an adhesive 5 and is ground and polished, or merely sawed, on its end face 3.2, depending on the optical requirements.

In order to fix the cladding 4 of the fiber-optic cable 2, in this alternative embodiment the metal sleeve configured as a segment 1.6 is likewise widened in such a way that the cladding 4 previously removed from the fiber-optic cable 2 can be inserted as far as the narrowing of the segment 1.6. The plastic sleeve configured as a second segment 1.7 of the mounting device 1 is welded in the fixing portion 1.2 to the cladding 4 of the fiber-optic cable 2 and widens in the direction of the end face 3.2 of the light guide 3, in such a way that the widened part of the metal sleeve (first segment 1.6) fits between the cladding 4 and the plastic sleeve (second segment 1.7). The metal sleeve has a circumferential corrugation, or indentation, in a connecting region 1.7.4 so that a mechanically firm connection between the segments 1.6, 1.7 of the mounting device 1 results after mounting of the two segments 1.6, 1.7 by a pressing or thermal deformation process in the connecting region 1.7.4.

This type of matching in conjunction with the welding in the fixing portion 1.2 allows a robust mechanical connection between the mounting device 1 and the fiber-optic cable 2. A sealing region 7 is optionally also provided here, which in the example shown is formed by an O-ring.

Figure 6:
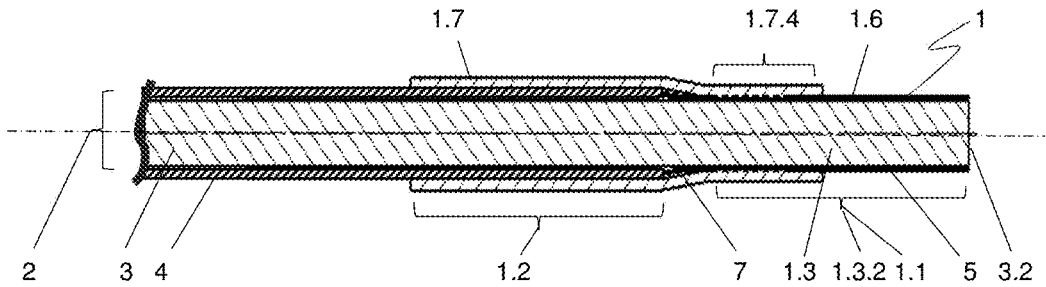
FIG. 6 shows a sectional view of another corresponding configuration variant of the mounting device provided according to the invention.

FIG. 6 shows a further variant of a two-part mounting device 1, comprising a first segment 1.6 configured as a metal sleeve and a second segment 1.7 configured as a plastic sleeve, the metal sleeve receiving the fiber bundle of the light guide 3 in its opening 1.3 and this fiber bundle being adhesively bonded by an adhesive 5 to the metal sleeve over the length L1, 1.3.2, in the region of the first fixing portion 1.1. The cladding 4 of the fiber-optic cable 2 is welded in the second fixing portion 1.2 to the segment 1.7 configured as a plastic sleeve, and during the mounting slides at least in portions over the metal sleeve (first segment 1.6), which has a circumferential corrugation, or indentation, in a connecting region 1.7.4 so that a mechanically firm connection between the segments 1.6, 1.7 of the mounting device 1 results after mounting of the two segments 1.6, 1.7 by a pressing or thermal deformation process in the connecting region 1.7.4. A sealing region 7 in the form of additional adhesive bonding and/or an inserted O-ring may in this case also be provided.

Figure 7:
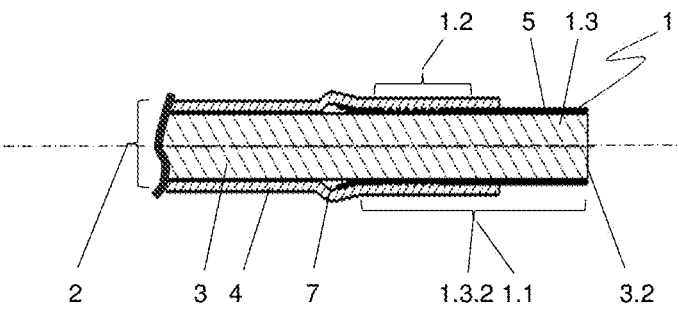
FIG. 7 shows a sectional view of another corresponding configuration variant of the mounting device provided according to the invention.

FIG. 7 lastly shows another example of an integral mounting device 1 consisting of metal or a plastic that adhesively bonds well, which receives the fiber bundle of the light guide 3 in its opening 1.3, this fiber bundle being adhesively bonded by an adhesive 5 to the metal or plastic sleeve over the length L1, 1.3.2, in the region of the first fixing portion 1.1. This sleeve has on the one hand a collar next to the end face 3.2 of the light guide 3 and on the other hand a circumferential corrugation, or indentation, in the region of the fixing portion 1.2. For the mounting, the cladding 4 of the fiber-optic cable 2 is widened so that can be slid over the collar and over the circumferential corrugation, or indentation. Subsequently, a thermal process may lead to the cladding 4 being welded to the plastic sleeve in the fixing region 1.2. The circumferential corrugation, or indentation, results in additional mechanical interlocking in order to increase the mechanical strength, the collar constituting a kind of tensile relief. If the mounting device 1 is configured as a metal sleeve, mechanical action may be achieved by the circumferential corrugation, or indentation, and the thermal deformation process of the cladding 4. A sealing region 7 in the form of additional adhesive bonding and/or an inserted O-ring may in this case also be provided in the region of the collar.

In principle, the metal sleeve described in connection with FIG. 5 to FIG. 7 may also be configured as a plastic sleeve, in particular consisting of a hard plastic that adhesively bonds well. In a two-part mounting device, for example corresponding to FIG. 6, a combination of the two material classes may also be provided, i.e. for example the first segment 1.6 as a plastic sleeve and the second segment 1.7 as a metal sleeve.

In respect of the sleeve material, the following selection criteria are advantageous for the material of the integral sleeve, or for the first segment 1.6 of the 2-part sleeve: on the one hand, the material must be sufficiently stable in respect of the final grinding and polishing processes in order to be braced in a fastening device. On the other hand, the material should not be susceptible to "spreading", that is to say it must optionally be rather brittle and/or filled with glass fibers (GF-filled plastics) or other, for example ceramic or vitreous fillers. Exemplary materials are therefore PC, PEEK, PEI, ABS, PMMA, COC, TPE-U, PA, PPS or PPSU. These can also be adhesively bonded well to the fiber bundle of the light guide 3. FEP, PVDF, ETFE, PFA are likewise suitable, although they require a chemical and/or physical surface pretreatment in respect of adhesive bonding ability.

Exemplary tube materials for the cladding 4 may on the one hand be: PC, PVC, PMMA, PMMI, COC, FEP, PFA, ETFE, THV, PVDF, PA, PE, PP, LDPE, LLDPE, LLDPE/PP, TPE-S, TPE-E, TPE-U. All these materials have a good adhesive bonding ability because of their very high polar surface energy.

On the other hand, especially fluorinated or partially fluorinated plastics (for example FEP, ETFE) or plastics consisting of polyolefins (for example PP, PE, PP-PE compounds) are of interest as clad material because of their properties, as mentioned in the introduction, for example owing to their high thermal and chemical stability, smooth surface and good haptics (low tackiness). Because of their low polar surface energy, these are counted as nonpolar and cannot therefore be adhesively bonded, or can be adhesively bonded only with great outlay.

Some surface energies of selected polymer materials are collated in the following Table 1:

TABLE 1

| Material | Disperse component of the surface energy (mJ/m$^2$) | Polar component of the surface energy (mJ/m$^2$) | Overall surface energy (mJ/m$^2$) |
|---|---|---|---|
| Epoxy resin | 19.5 | 13.2 | 32.7 |
| PA6 | 25.6 . . . 39.2 | 5.0 . . . 15.4 | 38.3 . . . 54.6 |
| PAEK | 36.0 | 3.8 | 39.8 |
| PBT | 39.4 . . . 41.8 | 3.3 . . . 9.4 | 43.8 . . . 48.8 |
| PC | 27.3 . . . 37.0 | 1.8 . . . 6.0 | 33.3 . . . 38.8 |
| PE-HD | 30.0 . . . 35.0 | 0.0 . . . 0.7 | 30.3 . . . 35.7 |
| PE-LD | 33.2 . . . 35.1 | 0.0 | 33.2 . . . 35.1 |
| PES | 42.1 | 5.1 | 47.2 |
| PET | 32.9 . . . 43.2 | 3.1 . . . 4.5 | 37.3 . . . 47.3 |

TABLE 1-continued

| Material | Disperse component of the surface energy (mJ/m$^2$) | Polar component of the surface energy (mJ/m$^2$) | Overall surface energy (mJ/m$^2$) |
|---|---|---|---|
| PFA | 19.1 | 3.4 | 22.5 |
| PMMA | 25.7 . . . 44.2 | 4.3 . . . 14.6 | 40.2 . . . 51.3 |
| POM | 36.0 . . . 42.2 | 5.1 . . . 11.1 | 42.1 . . . 47.9 |
| PP | 25.8 . . . 42.1 | 0.3 . . . 1.3 | 31.2 . . . 42.4 |
| PPE | 42.7 . . . 44.7 | 2.1 . . . 3.2 | 45.9 . . . 46.8 |
| PS | 23.3 . . . 44.6 | 0.6 . . . 6.9 | 29.0 . . . 45.4 |
| PSU | 42.1 | 4.2 | 46.3 |
| PTFE | 18.5 . . . 18.6 | 0.0 . . . 0.5 | 18.5 . . . 19.1 |
| PVB | 36.0 | 4.7 | 40.7 |
| PVC | 26.0 . . . 40.0 | 1.5 . . . 12.7 | 37.3 . . . 51.7 |
| SAN | 27.1 . . . 42.1 | 2.7 . . . 7.7 | 31.1 . . . 47.2 |
| TPU | 35.2 | 3.8 | 39.0 | typical surface energies or a selection of polymer materials (source: inter alia https://wiki.polymerservice-merseburg.de/index.php/Oberfl % C3% A4chenenergieof 26 Apr. 2024)

In this table, and where mentioned above, the material abbreviations stand for: PA6-polyamide type 6, PAEK—polyaryl ether ketone, PBT—polybutylene terephthalate, PC—polycarbonate, PE-(HD), LDPE—polyethylene (high density), PE-LD, LDPE—polyethylene (low density), PES—polyether sulfone, PET—polyethylene terephthalate, PFA—perfluoroalkoxy polymer (PTFE copolymer), PMMA—polymethyl methacrylate, POM—polyoxymethylene, PP—polypropylene, PPE—polyphenyl ether, PS—polystyrene, PSU—polysulfone, PTFE—polytetrafluoroethylene, PVB—polyvinyl butyral, PVC—polyvinyl chloride, SAN—styrene acrylonitrile copolymer, TPU, TPE-U—thermoplastic polyurethane, PEEK—polyether ether ketone, PEI—polyethylene imine, ABS—acrylonitrile butadiene styrene, COC—cycloolefin copolymers, PA—polyamide, PPS—polyphenylene sulfide, PPSU—polyphenyl sulfone, FEP—fluoroethylene propylene, PVDF—polyvinylidene fluoride, ETFE—ethylene tetrafluoroethylene copolymer, PVC—polyvinyl chloride, PMMI—polymethyl methacrylimide, THV—tetrafluoroethylene hexafluoropropylene vinylidene fluoride, LLDPE/ . . . . PP—linear polyethylene/ . . . polypropylene, TPE-S—styrene block copolymer, TPE-E—thermoplastic copolyester elastomers.

When the polar component of the surface energy is more than 1 mJ/m$^2$, the plastics are referred to as polar, whereas if it is lower they are referred to as nonpolar plastics, as described for example in [Erhard, G.: Konstruieren mit Kunststoffen (Building with plastics). 4th edition, Carl Hanser Verlag, Munich (2008), 152-153].

For both the integral and the 2-part solution approaches of the mounting device 1, the following dimension ranges have for example so far been found to be expedient (Table 2):

thickness upward towards the outer circumferential face 1.4.2 and/or downward towards the circumferential face 1.3.1, or such a wall may be provided. In the two-part embodiment of the mounting device 1, the wall thickness of the deformation region corresponds to the distance between the outer circumferential face 1.7.2 and the diameter of the opening 1.7.1. In the case of conical embodiments in these regions, the wall thickness of the deformation region respectively corresponds to its smallest value.

In summary, the approach shown in FIG. 1 with an integral sleeve as a mounting device 1 is characterized in that the cladding 4 is fixed by "mechanical fixing", that is to say by pressing or ultrasonic welding of the cable clad to the sleeve in a cavity 1.4, mechanically with a force fit and/or with a form fit. The cable clad is pushed into a cavity 1.4 in the sleeve assembly. This is followed by adhesive bonding, optionally with or without surface activation of cladding 4, deformation of the sleeve assembly, which may be carried out pointwise, over a surface or radially, or ultrasonic welding of the sleeve and the cladding 4. In order to prevent an excessive action of force on the underlying fiber bundle and therefore fiber fracture during the deformation process, the sleeve is configured to be more stable, or thicker in respect of the material thickness, in the region between the cladding 4 in the cavity 1.4 and the light guide 3, or fiber bundle. The action of force on the fiber bundle, which is necessary for fixing the tube on the sleeve, is therefore minimized. The fiber bundle of the light guide 3 may be adhesively bonded as usual to the sleeve and then optionally ground and polished. This variant is likewise suitable for

TABLE 2

| Cable DO* from to | Cable DI* from . . . to | Bundle diameter* from . . . to | Tube thickness SD* (cladding 4) from . . . to | Gap width* cavity 1.4 from . . . to | Wall thickness* deformation region from . . . to |
|---|---|---|---|---|---|
| 0.5 . . . 15 | 0.4 . . . 11 | 0.35 . . . 9 | 0.05 . . . 2 | 0.05 + SD . . . 0.5 + SD | 0, . . . 1 |

*data in mm, bundle diameter corresponds to the diameter of a bundle of light-guide fibers or of a single fiber;
DO = diameter, outer; DI = diameter, inner The deformation region, or its wall thickness, refers in the integral embodiment of the mounting device 1 to the wall thickness which remains, or is formed, above and/or below the cavity 1.4. There may in each case be a differing wall closed sleeves (see FIG. 1A) such as are used for example in automotive light-guide cables. The situation is similar for the examples of an integral sleeve that are shown in FIGS. 4 and 7.

The 2-part approach, as is shown by way of example in FIGS. 2 and 3, offers the advantage that different materials, or two material components, of the sleeve may be combined. This may involve on the one hand a plastic-plastic combination or alternatively a metal-plastic combination. The second segment 1.7 of the sleeve may in this case be matched optimally to the method of fixing the cladding 4, the first segment 1.6 of the sleeve being configured optimally for an adhesive bond to the fiber bundle of the light guide 3. The first and second segments 1.6, 1.7 may also be directly connected nonreleasably, for example in a 2-stage injection-molding process. A further option is subsequent connection by latching via clip fastening of the two segments 1.6, 1.7. There is also the possibility of subjecting the cladding 4 and/or the fixing portion 1.2 for the cladding 4 to a chemical and/or physical surface pretreatment before the mounting. It is particularly suitable, as shown in FIG. 3, for the cladding 4 to be connected to the second segment 1.7 by ultrasonic welding in the region of the second fixing portion 1.2. For this purpose, it is then advantageous for the second segment 1.7 to be materially similar, or in the ideal case identical, to the clad material. Furthermore, the fixing of the cladding 4 to the second segment 1.7 of the sleeve may also take place by a cavity 1.4 for receiving the cladding 4 and subsequent introduction of deformations, or undercut regions 1.4.5, by pressing, as is shown in FIG. 1. The situation is similar for the examples of a two-part sleeve that are shown in in FIGS. 5 and 6.

Both solution approaches, whether with a mounting device 1 configured integrally or in two parts, make it possible to fix the protective sleeve, or the cladding 4, in or on the plastic sleeve. This prevents the tube from slipping out of the sleeve and the bundle thereby being exposed. The bundle is protected against dirt, moisture and mechanical influences. An additional sealing region 7, as is shown in FIGS. 4 to 7, additionally reinforces this. By suitable design of the sleeve, it may also be produced from two components (for example metal and plastic or type 1 plastic combined with type 2 plastic). An extremely stable adhesive bond of the fiber bundle to the metal sleeve, or of a polar plastic in the first segment 1.6 in combination with permanent fixing of the cable clad to the second segment 1.7, is in this case possible. The sleeve embodiment which is selected may be decided according to the specific application on the clad material, the clad fixing taking place by deformation (hot or cold) of the inner circumferential face 1.4.1 and/or outer circumferential face 1.4.2 of the cavity 1.4, pointwise, over a surface or radially adhesive bonding or the sleeve assembly, or its inlay (second segment 1.7)

hot fusion of the inlay (second segment 1.7) to the clad ultrasonic welding of the sleeve assembly (inner circumferential face 1.4.1 and/or outer circumferential face 1.4.2 of the cavity 1.4) or of the inlay (second segment 1.7) to the clad optionally, a surface activation by plasma, fluorination, corona discharge or the like, or by a chemical treatment, may additionally take place if required.

With the embodiments of the mounting device 1 as described above, defined fixing of the envelope tube of a glass-fiber cable in or on a plastic sleeve in order to protect the inner-lying fiber bundle against dirt and/or moisture can in particular be achieved. Furthermore, elaborate thermal post-treatment for clad materials with strong after-shrinkage may be obviated, or this may be made much less elaborate.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

REFERENCE SIGNS

1 mounting device
    1.1 first fixing portion
    1.2 second fixing portion
    1.3 opening
    1.3.1 inner circumferential face
    1.3.2 length L1
    1.4 cavity
    1.4.1 inner circumferential face
    1.4.2 outer circumferential face
    1.4.3 depth L2
    1.4.5 deformation, undercut region
    1.5 outer circumferential face
    1.6 first segment
    1.6.1 opening
    1.6.2 inner circumferential face
    1.6.3 length L3
    1.6.4 connecting region
    1.7 second segment
    1.7.1 opening
    1.7.2 outer circumferential face
    1.7.3 length L4
    1.7.4 connecting region
    1.8 screw or latch connecting region
    1.9 clamping region
    2 fiber-optic cable
    3 light guide
    3.1 outer circumferential face
    3.2 end face
    4 cladding
    5 first adhesive
    6 second adhesive
    7 sealing arrangement
    8 sleeve

What is claimed is:

1. A mounting device for a fiber-optic cable, wherein the fiber-optic cable comprises a light guide comprising or consisting of at least one optical fiber or a bundle of a plurality of optical fibers and a cladding which fully encloses the light guide at least in portions on its outer circumferential face;

the mounting device being formed from one piece or from a first segment and a second segment, and has a first fixing portion and a second fixing portion, which is spatially separated from the first fixing portion, wherein the second fixing portion is arranged substantially concentrically around the first fixing portion, and wherein the light guide is connected or connectable at least partially or in portions materially to the first fixing portion and the cladding is connected or connectable to the second fixing portion at least partially or in portions with a form fit, with a force fit and/or materially, so that the fixing of the light guide and the fixing of the cladding on the mounting device are separated or separable from one another.

2. The mounting device of claim 1, wherein the mounting device is configured as an integral component.

3. The mounting device of claim 2, wherein the first fixing portion is formed by a substantially central opening of the mounting device, wherein the central opening has an inner circumferential face and a length L1, and is intended to receive the light guide.

4. The mounting device of claim 3, wherein the second fixing portion is formed by a substantially annular cavity around the central opening, wherein the cavity has a depth of length L2, an inner circumferential face, and an outer circumferential face, and is intended to receive the cladding.

5. The mounting device of claim 4, wherein the light guide of the fiber-optic cable is connected or connectable by a first adhesive to the first fixing portion on its inner circumferential face at least partially or in portions; and/or wherein the cavity of the second fixing portion has on its inner circumferential face and/or on its outer circumferential face, in a region of the depth L2, at least one deformation to which the cladding of the fiber-optic cable is fixed or fixable at least partially or in portions with a form fit.

6. The mounting device of claim 5, wherein at least one of the following features is satisfied:

the at least one deformation is arranged radially circumferentially on the inner circumferential face and/or on the outer circumferential face of the second fixing portion;

the at least one deformation comprises deformations that are arranged corresponding with one another on the inner circumferential face and on the outer circumferential face of the second fixing portion; or a connection of the cladding onto the second fixing portion and to the cavity comprises a thermal and/or press or crimp connection or a combination thereof.

7. The mounting device of claim 3, wherein the second fixing portion for receiving the cladding is formed at least in portions along a length L2 of an outer circumferential face.

8. The mounting device of claim 7, wherein the light guide of the fiber-optic cable is connected or connectable by a first adhesive to the first fixing portion on its inner circumferential face at least partially or in portions, and wherein the cladding of the fiber-optic cable is fixed or fixable by a second adhesive to the second fixing portion on its outer circumferential face at least partially or in portions.

9. The mounting device of claim 8, wherein at least one of the following features is satisfied:

a connection of the cladding onto the second fixing portion comprises a thermal and/or press or crimp connection or a combination thereof;

the connection of the cladding onto the second fixing portion has at least one deformation, to which the cladding of the fiber-optic cable is fixed or fixable at least partially or in portions with a form fit; or the at least one deformation is arranged radially circumferentially on the outer circumferential face of the second fixing portion.

10. The mounting device of claim 1, wherein the mounting device comprises a first segment and a second segment, and wherein the first fixing portion is formed by a substantially central opening of the first segment, the opening having an inner circumferential face and a length L3, and being intended to receive the light guide, and wherein the second segment has a substantially central opening, which is intended for feeding the light guide through, and the second fixing portion, wherein the second fixing portion has an outer circumferential face of length L4 for applying the cladding at least partially or in portions, and/or wherein the first segment has a connecting region and the second segment has a connecting region for mechanically connecting the two segments at least partially or in portions, so that a connecting zone is formed or formable in the connected state.

11. The mounting device of claim 10, wherein a material of the cladding corresponds to a material of the second segment and a connection of the cladding onto the second fixing portion of the second segment is connected or connectable at least partially or in portions with a force and/or form fit.

12. The mounting device of claim 10, wherein at least one of the following features is satisfied:

the first segment and the second segment are connected or connectable releasably to one another via their connecting regions by a latch or clip connection, a bayonet connection and/or a screw connection; or the first segment and the second segment form a clamping region on or around the connecting zone for receiving and mechanically fixing the cladding of the light guide.

13. The mounting device of claim 1, wherein at least one of the following features is satisfied:

the light guide comprises or consists of polymer optical fibers, glass-based optical fibers, and/or quartz-based optical fibers;

the light guide of the fiber-optic cable is connected or connectable by a first adhesive to the first fixing portion on its inner circumferential face at least partially or in portions and the first adhesive comprises or consists of a 2K epoxy adhesive, or a 1K or 2K silicone adhesive;

the second fixing portion is formed by a substantially annular cavity and the cladding is connected or connectable to or around the second fixing portion and/or to the cavity by a second adhesive;

at least the inner circumferential face of the first fixing portion, the inner circumferential face, and/or an outer circumferential face of the second fixing portion have a chemical or physical surface activation and/or at least one adhesion promoter layer;

at least the inner circumferential face of the first fixing portion and/or the outer circumferential face of the second fixing portion have a chemical or physical surface activation and/or at least one adhesion promoter layer;

the first fixing portion has a conical portion in a delivery direction of the light guide on its inner circumferential face;

the mounting device has rounded edges in the delivery direction of the light guide; or an opening forming the first fixing portion is closed off on one side in the delivery direction of the light guide in a region of its end face and the mounting device at least in this region comprises or consists of a transparent material.

14. The mounting device of claim 1, wherein the second fixing portion is pressed into the cladding.

15. The mounting device of claim 1, wherein the light guide is connected at least partially or in portions materially to the first fixing portion.

* * * * *